United States Patent
Pursifull et al.

(10) Patent No.: US 8,042,335 B2
(45) Date of Patent: Oct. 25, 2011

(54) INTAKE AIR HEATING AND EXHAUST COOLING

(75) Inventors: Ross Dykstra Pursifull, Dearborn, MI (US); Thomas G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/793,074

(22) Filed: Jun. 3, 2010

(65) Prior Publication Data

US 2011/0138774 A1    Jun. 16, 2011

(51) Int. Cl.
 *F02D 23/00* (2006.01)
 *F01N 3/02* (2006.01)
 *F01N 5/02* (2006.01)

(52) U.S. Cl. .............. 60/602; 60/298; 60/320; 60/321

(58) Field of Classification Search .............. 60/602, 60/289, 298, 320, 321
See application file for complete search history.

(56) References Cited

U.S. PATENT DOCUMENTS

| | | | |
|---|---|---|---|
| 3,435,613 A * | 4/1969 | Granieri, Jr. et al. | 60/298 |
| 3,656,303 A * | 4/1972 | La Force | 60/298 |
| 4,079,715 A | 3/1978 | Masaki et al. | |
| 5,331,930 A * | 7/1994 | McWhorter | 123/79 R |
| 5,655,506 A | 8/1997 | Hollis | |
| 5,724,931 A | 3/1998 | Hollis | |
| 6,854,263 B1 * | 2/2005 | Bruck et al. | 60/320 |
| 2006/0191260 A1* | 8/2006 | Meyer | 60/320 |
| 2007/0144500 A1 | 6/2007 | Dupree et al. | |
| 2007/0199310 A1* | 8/2007 | Eybergen et al. | 60/289 |

FOREIGN PATENT DOCUMENTS

| | | |
|---|---|---|
| DE | 29 42 699 A1 | 5/1981 |
| GB | 2 114 655 A | 8/1983 |
| JP | 58165559 A | 9/1983 |
| JP | 2007141848 A | 6/2007 |

OTHER PUBLICATIONS

Ulrey, Joseph Norman et al., "Exhaust Heat Recovery for Engine Heating and Exhaust Cooling," U.S. Appl. No. 12/793,447, filed Jun. 3, 2010, 23 pages.

Lippa Allan J. et al., "Warming Intake Air Using EGR Cooler in Dual-Throttle Boosted Engine System," U.S. Appl. No. 12/684,337, filed Jan. 8, 2010, 41 pages.

* cited by examiner

*Primary Examiner* — Mary A Davis

(74) *Attorney, Agent, or Firm* — Allan J. Lippa; Alleman Hall McCoy Russell & Tuttle LLP

(57) ABSTRACT

Intake air heating and exhaust cooling is provided by a double wall exhaust system serving as an exhaust-to-air heat exchanger, sourcing hot air to the intake manifold for intake stroke pumping benefit and cooling the exhaust system during high load operation by routing excess boost air through an interstitial space of the double wall.

16 Claims, 4 Drawing Sheets

INTAKE AIR HEATING AND EXHAUST COOLING

TECHNICAL FIELD

The present application relates to intake air heating and exhaust cooling.

BACKGROUND AND SUMMARY

Heated intake air has been shown to provide a fuel economy benefit (e.g., 1.6%) from reduced pumping losses, and may also provide faster engine warm-up. In one approach, this may be accomplished via coolant heating of engine intake air. In such a case, intake air may be warmed via an exhaust gas recirculation (EGR) cooler.

The inventors of the present application have recognized a problem in such previous solutions. First, the maximum coolant temperature (e.g., 230° F.) may limit the amount of heat that can be provided to the engine inlet air. Second, the relatively slow warm-up of the coolant may limit the portion of the trip time that may be utilized to heat intake air.

Accordingly, in one example, some of the above issues may be addressed by intake air heating and exhaust cooling, wherein a double wall exhaust manifold may be configured as an exhaust-to-air heat exchanger. When the intake manifold pressure is less than ambient pressure, the engine can benefit from heated intake air. In such a case, fresh air may be drawn through an interstitial space of a double wall exhaust manifold to heat the air, and then the heated air may be directed to an intake manifold. As such, heated air is sourced to the intake manifold for intake stroke pumping benefit. In this way, by increasing the air heating with the hotter-than-coolant exhaust surfaces, the fuel economy benefit can be further enhanced. Moreover, ample exhaust heat is typically available in less than one minute after start, compared to three minutes or more for coolant heat.

Further, the inventors of the present application have recognized that the double wall exhaust manifold may additionally serve as an exhaust manifold cooler, by routing excess boost air through the interstitial air space, to cool the exhaust manifold during high load operation. As such, liquid cooling via an integrated exhaust manifold may be eliminated. Such cooling may be beneficial when the intake manifold pressure is greater than ambient pressure and the exhaust temperature is nearing a threshold associated with component durability. In this way, by cooling the exhaust manifold with air derived from excess boost, the fuel economy and emissions penalty of cooling via fuel enrichment can be reduced.

In this way, the double wall exhaust manifold as described herein establishes a synergy in functionality, in that intake air can be drawn in precisely when intake heating is desired, and the excess boost can push air precisely when exhaust cooling is desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Embodiments of intake air heating and exhaust cooling are disclosed herein. Such an approach utilizes an interstitial space of a double wall exhaust manifold for heating intake air when the intake manifold pressure is less than ambient pressure and for cooling exhaust gas when the intake manifold pressure is greater than ambient pressure, as described in more detail hereafter.

Figure 1:
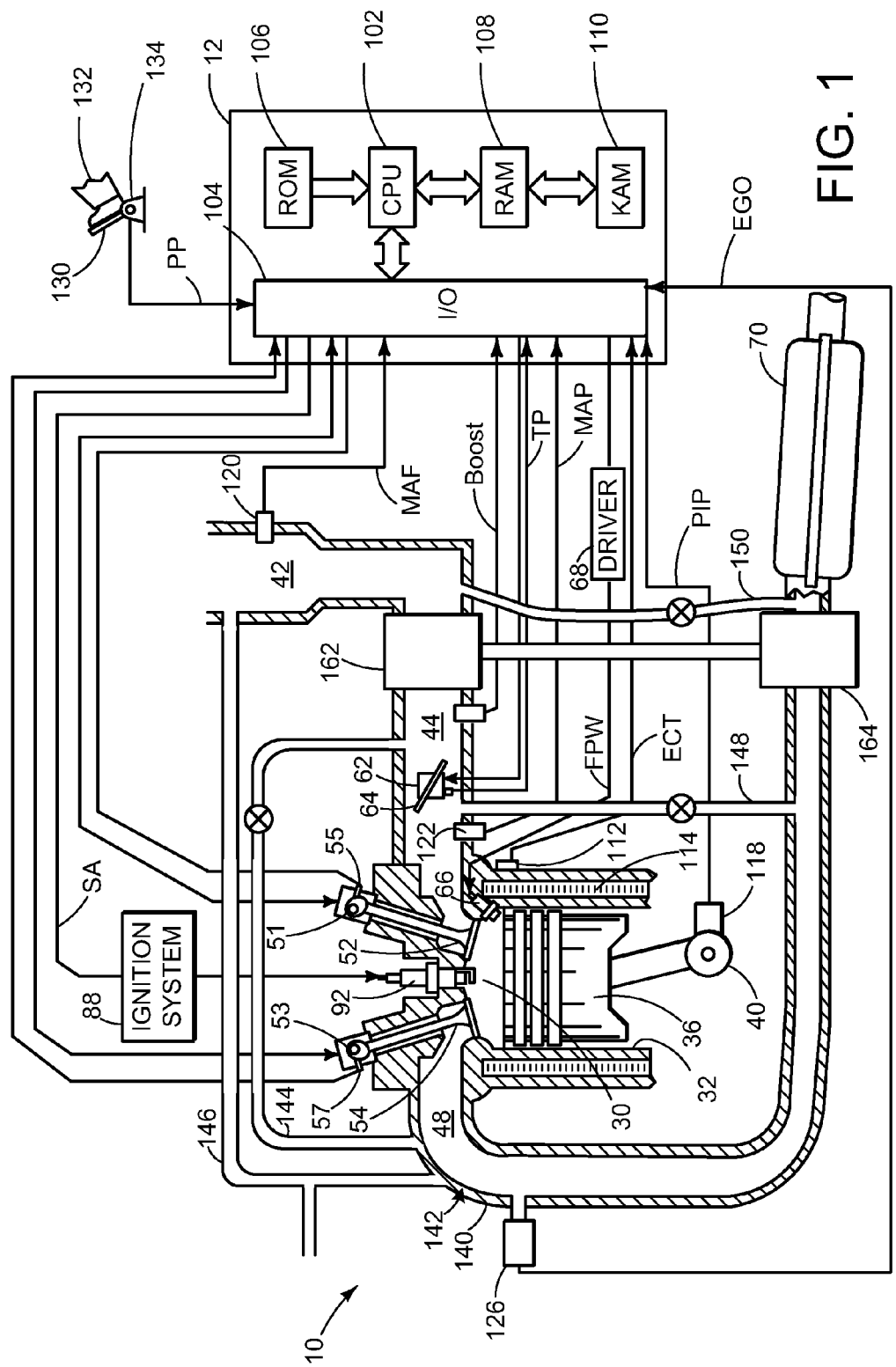
FIG. 1 shows a block diagram of an example engine in accordance with embodiments of the present disclosure.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage (e.g., manifold) 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

Engine 10 may further include a compression device such as a turbocharger or supercharger including at least a compressor 162 arranged along intake manifold 44. For a turbocharger, compressor 162 may be at least partially driven by a turbine 164 (e.g. via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12.

FIG. 1 further shows exhaust manifold 48 having a double wall exterior 140 defining an interstitial space 142 through which air may flow. The interstitial space may be manufactured similar to that of a liquid space. FIG. 1 further shows a conduit 144 connecting the interstitial space to the intake manifold 44. As such, when intake manifold pressure is less than ambient pressure, fresh air sourced via a fresh air conduit 146 may be drawn through interstitial space 142 to heat the air, and the heated air may then be directed to intake manifold 44 via conduit 144. Moreover, when intake manifold pressure is greater than ambient pressure, intake air may be drawn from intake manifold 44 via conduit 144 to interstitial space 142. The air is then drawn through the interstitial space 142 to cool exhaust gas. In this way, the double wall exhaust manifold 48 serves as an exhaust-to-air heat exchanger, sourcing hot air to intake manifold 44 for the intake stroke pumping benefit and warm-up benefit, and also cooling exhaust manifold 48 during high load operation by routing excess boost air through interstitial space 142. In this way, by heating the intake air, intake stroke pumping work may be reduced and engine warm-up may be improved, and thus, fuel economy may be increased. Further, use of heated positive crankcase ventilation (PCV) valve and/or heated throttle body may be eliminated, and the compressor bypass valve may be eliminated or reduced in size. Further, cooling of exhaust gas and/or exhaust components via enrichment with fuel or another fluid may be reduced or avoided. Also, lower temperature-rated materials may be utilized, and thus a cost savings may be achieved. Such intake air heating and exhaust cooling is described in more detail hereafter.

Further, a boosted engine may exhibit higher combustion and exhaust temperatures than a naturally aspirated engine of similar output power. Such higher temperatures may cause increased nitrogen-oxide (NOx) emissions from the engine and may accelerate materials ageing, including exhaust-aftertreatment catalyst ageing. Exhaust-gas recirculation (EGR) is one approach for combating these effects. EGR works by diluting the intake air charge with exhaust gas, thereby reducing its oxygen content. When the resulting air-exhaust mixture is used in place of ordinary air to support combustion in the engine, lower combustion and exhaust temperatures result. EGR may also improve fuel economy in gasoline engines by reducing throttling losses and heat rejection.

In boosted engine systems equipped with a turbocharger compressor mechanically coupled to a turbine, exhaust gas may be recirculated through a high pressure (HP) EGR loop 148 or through a low-pressure (LP) EGR loop 150. In the HP EGR loop 148, the exhaust gas is taken from upstream of the turbine 164 and is mixed with the intake air downstream of the compressor 162. In an LP EGR loop 150, the exhaust gas is taken from downstream of the turbine 164 and is mixed with the intake air upstream of the compressor 162.

HP and LP EGR strategies achieve optimum efficacy in different regions of the engine load-speed map. For example, on boosted gasoline engines running stoichiometric air-to-fuel ratios, HP EGR is desirable at low loads, where intake vacuum provides ample flow potential; LP EGR is desirable at higher loads, where the LP EGR loop provides the greater flow potential. Accordingly, in some embodiments, a control valve within conduit 144 may be opened when the system would benefit from warm, non-dilute air instead of the EGR-diluted air that may exist in the intake system due to previous operation. As an example, when the intake manifold pressure is greater than ambient pressure, the control valve within conduit 144 may be opened to discharge boost from the intake manifold, allowing the intake manifold pressure to decrease below ambient pressure, such that warm fresh air may be drawn from the double wall of the exhaust manifold through the conduit to replace the EGR-diluted air.

Moreover, during TIP-out conditions where engine load suddenly decreases, a significant amount of unwanted, compressed intake air may be trapped upstream of throttle 62. As such, opening a control valve within conduit 144 may provide a blow-off mechanism for compressor 162. In this manner, excess boost pressure may be routed back to the compressor inlet when an EGR valve is closed.

As described above, FIG. 1 shows only one cylinder of a multi-cylinder engine, and that each cylinder may similarly include its own set of intake/exhaust valves, fuel injector, spark plug, etc.

Figure 2:
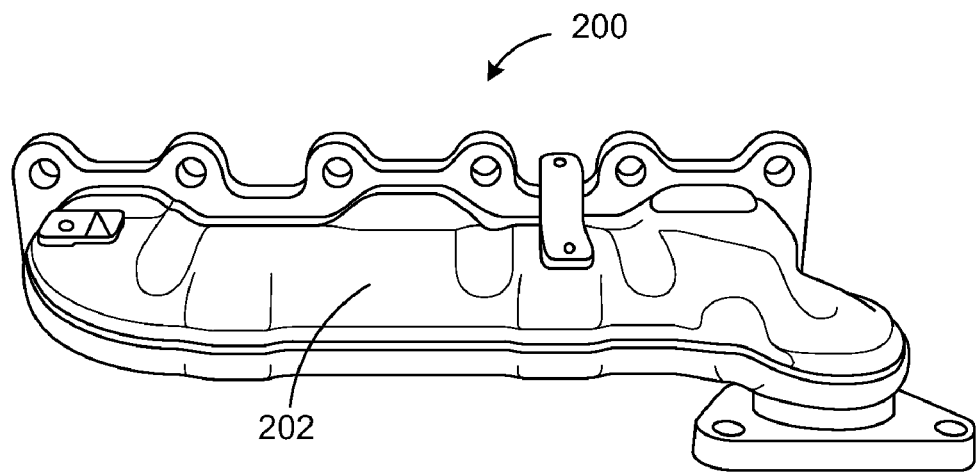
FIG. 2 shows a schematic depiction of an example double wall exhaust manifold.
Figure 3:
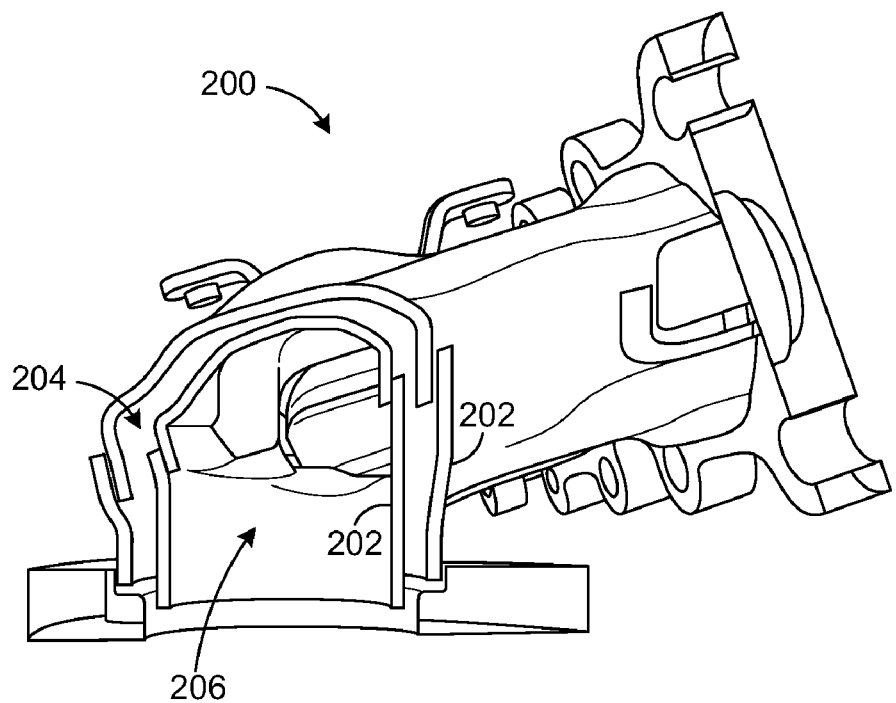
FIG. 3 shows a schematic depiction of a cross-section of the double wall exhaust manifold of FIG. 2.

Turning now to FIG. 2, FIG. 2 shows an example exhaust manifold 200 having a double wall exterior 202. FIG. 3 shows a cross-section of exhaust manifold 200, illustrating the interstitial space 204 of the double wall exterior through which air may flow. It should be appreciated that interstitial space 204 is distinct from the inner cavity 206 of exhaust manifold 200 through which exhaust gas may flow.

Figure 4:
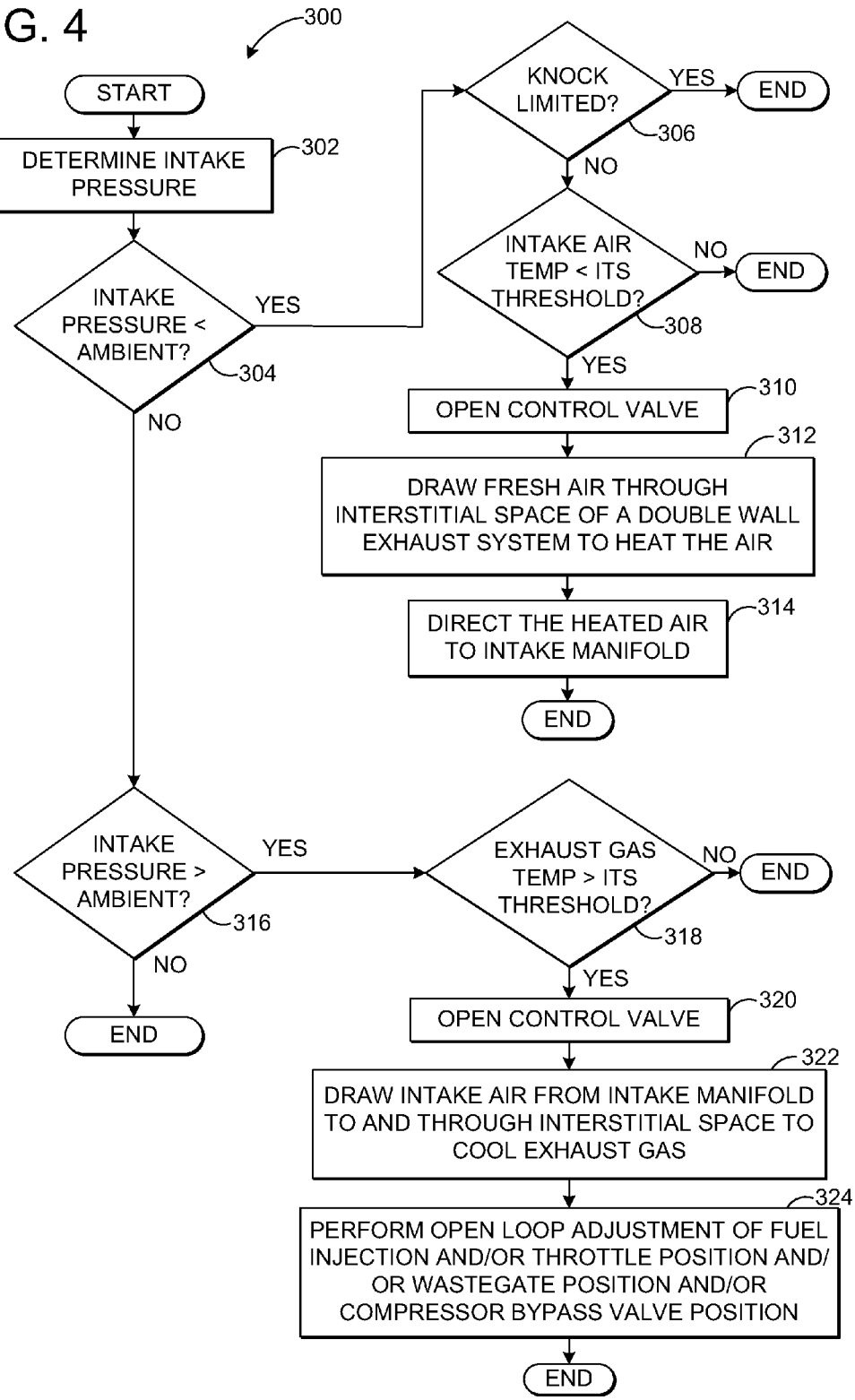
FIG. 4 shows a flow diagram of a method of an engine in accordance with embodiments of the present disclosure.

Turning now to FIG. 4, FIG. 4 illustrates an example method 300 of an engine. Such an engine may be a boosted engine, such as described above with reference to FIG. 1. Initially, a control valve within a conduit coupling the interstitial space to the intake manifold downstream of the turbocharger may be in a closed position, and thus, air cannot flow between the intake manifold and the interstitial space of the exhaust manifold. At 302, method 300 includes determining an intake manifold pressure. At 304, if the intake manifold pressure is less than a threshold pressure (e.g., ambient pressure), method 300 proceeds to 306 where it is determined if the engine is knock-limited. Such a determination may include monitoring engine speed, load, spark timing, coolant temperature, intake air temperature, etc. to determine whether the spark timing is near a borderline spark timing, the borderline timing representing the most advanced spark allowed before potential knock generation. If the engine is knock-limited, then method 300 ends. However, if the engine is not knock-limited, then method 300 proceeds to 308 where it is determined if the intake air temperature is less than a threshold temperature. As an example, such a threshold may correspond to a desired intake air temperature, or it may correspond to a maximum temperature for durability of the intake manifold or other components. A desired intake air temperature may be calculated to minimize pumping losses and minimize engine warm-up time, for example as a function of speed, load, ambient temperature, engine temperature, time since start, etc.

If the intake air temperature is not below such a threshold, then the intake may be warm enough for desired combustion within the cylinders, and method 300 ends. However, if the intake air temperature is below such a threshold, then benefit may be achieved by heating the intake air, and method 300 proceeds to 310.

At 310, method 300 includes opening the control valve within the conduit coupling the interstitial space to the intake manifold downstream of the turbocharger. The control valve may be a simple on/off valve, or it may be modulated. The control valve may be modulated to achieve the desired intake air temperature, for example using PID feedback controls based on a comparison of measured air temperature to the desired air temperature. At 312, method 300 includes drawing fresh air through the interstitial space of a double wall exhaust manifold to heat the air. Since the exhaust manifold surfaces are hot, they are typically able to transfer more heat to air within the interstitial space than may be achieved by traditional coolant heating of the air. Further, ample exhaust heat is typically available faster than coolant heat, thus air in the interstitial space may be heated quickly. At 314, method 300 includes directing the heated air into the intake manifold. As such, an enhanced fuel economy benefit may be achieved.

Figure 5:
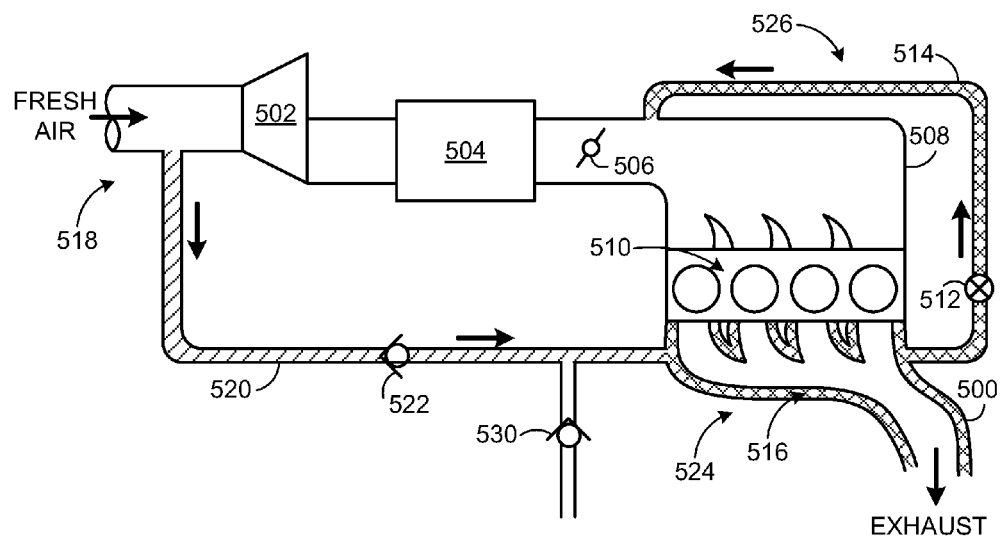
FIG. 5 shows a schematic depiction of an embodiment of intake air heating via a double wall exhaust manifold.

FIG. 5 shows an example of intake air heating via a double wall exhaust manifold 500 (shown as a cross-section). In the depicted example, fresh air typically flows through a compressor 502 and an inter-cooler 504 before being adjusted via a throttle 506 and flowing into an intake manifold 508. Intake air is then fed from the intake manifold 508 into cylinders 510 for combustion with fuel. Exhaust gas from the combustion is then output to exhaust manifold 500.

When the intake manifold pressure is less than ambient, and the engine is not knock-limited, the engine may benefit from heated intake air. This is because heated intake air may decrease pumping work on the intake stroke, and heated intake air may also improve engine warm-up. Thus, during a first condition, a control valve 512 within a conduit 514 which couples the interstitial space 516 of exhaust manifold 500 to the intake manifold 508 downstream of the turbocharger may be opened. As described above, the first condition may be an engine combusting condition, wherein the intake pressure is below ambient and wherein the engine is not knock-limited. In some embodiments, this may be a non-boosted and/or throttled condition. Thus, as shown at 518, fresh air may be drawn through a fresh air conduit 520 past a check valve 522 and into interstitial space 516, where the air is then heated by the surfaces of the double wall exhaust manifold 500, as indicated at 524. The heated air is then drawn from the interstitial space 516 into conduit 514, past control valve 512, in a direction toward intake manifold 508, as indicated at 526. As such, the heated air is then sourced to the intake manifold 508. In some embodiments, such a system may further include one or more ejectors positioned inline with the heated air flow to create a vacuum for positive crankcase ventilation, fuel vapor purge, or vacuum-powered actuation. Further, in some embodiments, the fresh air may be drawn through an air cleaner before passing check valve 522. In some embodiments, control valve 512 may be opened when the system would benefit from warm, non-dilute air instead of the EGR-diluted air that may exist in the intake system due to previous operation, such as during tip-in, and/or tip-out conditions as noted above herein.

Returning to FIG. 4, if it is determined at 304 that the intake manifold pressure is not less than ambient, method 300 proceeds to 316 where it is determined if the intake manifold pressure is greater than a threshold pressure (e.g., ambient pressure). If the intake manifold pressure is not greater than ambient pressure then method 300 ends and the control valve remains closed. However, if the intake manifold pressure is greater than ambient, then method 300 proceeds to 318 where it is determined if the exhaust gas temperature is greater than a threshold temperature, indicating that exhaust cooling may be desirable. If the exhaust gas temperature is not greater than the threshold temperature, then the exhaust gas may not benefit from additional cooling and thus method 300 ends. However, if the exhaust gas temperature is greater than the threshold, then method 300 proceeds to 320.

At 320, method 300 includes opening a control valve within the conduit coupling the interstitial space to the intake manifold. The control valve may be a simple on/off valve, or it may be modulated to achieve the desired degree of exhaust cooling, subject to the amount of excess boost air available. At 322, method 300 includes drawing intake air from the intake manifold to and through the interstitial space to cool exhaust gas. At 324, method 300 includes performing an open loop adjustment of the fuel injection and/or throttle position and/or wastegate position and/or compressor bypass valve position, to compensate for the intake air drawn through the conduit which thus bypassed the cylinders.

Figure 6:
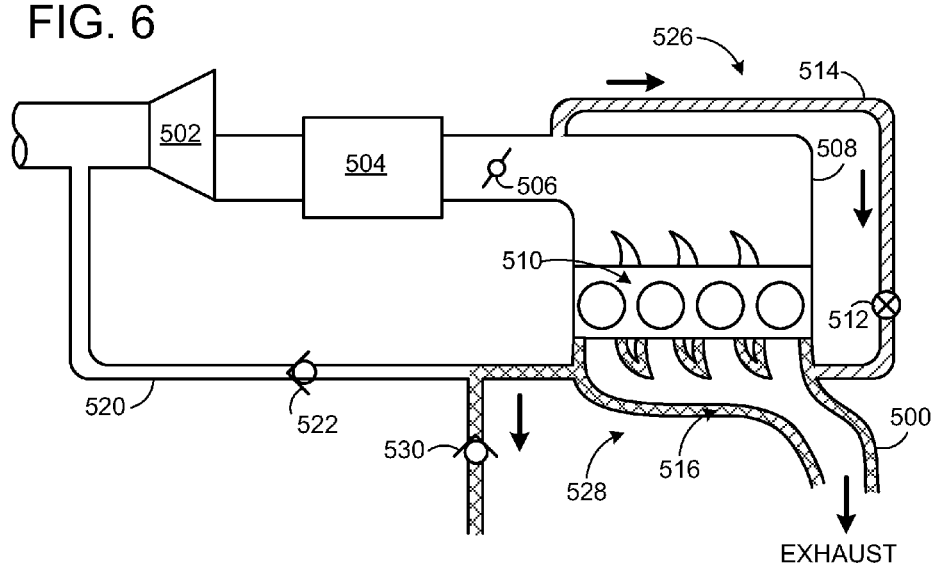
FIG. 6 shows a schematic depiction of an embodiment of exhaust cooling via a double wall exhaust manifold.

FIG. 6 shows an example of exhaust cooling via a double wall exhaust manifold 500. When the intake manifold pressure is greater than ambient conditions, the exhaust temperature may be nearing a threshold associated with component durability. In this case, a fuel economy and emissions penalty of exhaust cooling via fuel enrichment may be avoided by cooling the exhaust manifold with air derived from excess boost. Thus, during a second condition, control valve 512 within conduit 514 may be opened. As described above, the second condition includes the intake pressure being greater than an ambient pressure, and thus the second condition is different than the first condition. In some embodiments, this may be a boosted, high-load, and/or non-throttled condition. Thus, as shown at 526, intake air may be drawn from intake manifold 508 through the control valve 512 in a direction toward exhaust manifold 500. It should be appreciated that in some cases, the cooling air may alternatively be sourced pre-throttle or post-compressor. However, in such cases, additional plumbing components may be included to accomplish the dual objectives.

The air then enters the interstitial space 516 where the air cools the exhaust gas, as indicated at 528. By utilizing such air cooling instead of liquid cooling, extra heat rejection capacity need not be added to a coolant system. The air may then pass through another check valve 530, where the air is then directed out to atmosphere or to any component(s) that could benefit from heating (e.g., CNG regulator, cabin heat, transmission oil, differential lubricant, etc). The fuel injection may be adjusted (e.g., by performing an open loop adjustment) to compensate for the intake air being drawn from the intake manifold. As such, stoichiometry for engine combustion may be maintained. The throttle and/or wastegate and/or compressor bypass may also be adjusted (e.g., by performing an open loop adjustment) to compensate for the intake air being drawn from the intake manifold and maintain the desired level of air flow to the engine cylinders. Further, in some embodiments, such a system may further include one or more ejectors positioned inline with the conduit flow to create a vacuum for positive crankcase ventilation, fuel vapor purge, or vacuum-powered actuation.

In this way, intake air heating and exhaust cooling as described herein establishes a synergy in functionality, in that intake air can be drawn in precisely when intake heating is desired, and the excess boost can push air precisely when exhaust cooling is desired. For this reason, in some embodiments, a passive (without controller intervention) implementation may be utilized. Further, during transient power increases, an excess boost condition may not be present. However, such transients generally do not create sufficient exhaust heat to require exhaust cooling, rather such cooling is more typically required at steady state conditions. Thus, the system typically has excess boost at high power levels when exhaust cooling is desired.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for an engine, comprising:
   during conditions when intake manifold pressure is less than ambient pressure, drawing fresh air through an interstitial space of a double wall exhaust system to heat the air, and then directing the heated air to an intake manifold; and
   during conditions when intake manifold pressure is greater than ambient pressure, drawing intake air from the intake manifold to and through the interstitial space to cool exhaust gas.

2. The method of claim 1, wherein conditions when intake manifold pressure is less than ambient pressure further include an engine combusting condition.

3. The method of claim 1, wherein conditions when intake manifold pressure is less than ambient pressure further include a non engine knocking condition.

4. The method of claim 1, wherein the method further comprises, during conditions when intake manifold pressure is less than ambient pressure, directing the heated air to the intake manifold in a first direction via a conduit comprising a control valve.

5. The method of claim 4, wherein the method further comprises, during conditions when intake manifold pressure is greater than ambient pressure, drawing intake air from the intake manifold to the interstitial space in a direction opposite to the first direction via the conduit.

6. The method of claim 1, wherein the double wall exhaust system further comprises an exhaust conduit through which exhaust gas flows, the exhaust conduit being distinct from the interstitial space.

7. The method of claim 1, further comprising during conditions when intake manifold pressure is greater than ambient pressure, adjusting at least one of fuel injection, throttle, wastegate, and compressor bypass, to compensate for the intake air being drawn from the intake manifold.

8. The method of claim 1, wherein conditions when intake manifold pressure is less than ambient pressure further include determining that an intake air temperature is less than a threshold temperature.

9. The method of claim 1, wherein conditions when intake manifold pressure is greater than ambient pressure further include determining that an exhaust gas temperature is greater than a threshold temperature.

10. A system for an engine, comprising:
a boost device;
an intake manifold;
an exhaust system having a double wall exterior defining an interstitial space;
a conduit coupling the interstitial space to the intake manifold downstream of the boost device;
a control valve within the conduit; and
a controller configured to execute instructions to:
during a first condition, open the control valve to draw fresh air heated from the exhaust system interstitial space into the intake manifold;
during a second condition, open the control valve to draw intake air from the intake manifold into the interstitial space; and
during a third condition, close the control valve.

11. The system of claim 10, wherein the interstitial space of the double wall exterior of the exhaust system serves as an exhaust-to-air heat exchanger.

12. The system of claim 10, wherein the controller is further configured to execute instructions to, during the second condition, adjust at least one of fuel injection, throttle, wastegate, and compressor bypass, to compensate for the intake air being drawn from the intake manifold.

13. The system of claim 10, wherein the first condition includes a non-boosted non-knock-limited condition and the second condition includes a boosted condition.

14. The system of claim 13, wherein the first condition further comprises an intake air temperature being less than an intake threshold temperature and wherein the second condition further comprises an exhaust gas temperature being greater than an exhaust threshold temperature.

15. The system of claim 10, wherein the exhaust system further comprises an exhaust conduit through which exhaust gas flows, the exhaust conduit being distinct from the interstitial space.

16. A method for an engine, comprising:
during a first condition when an intake manifold pressure is less than ambient pressure, drawing fresh air through an air cleaner, through a first check valve and through an interstitial space of a double wall exhaust system to heat the air, and then directing the heated air out of the interstitial space through a control valve and into an intake manifold; and
during a second condition when the intake manifold pressure is greater than ambient pressure, drawing intake air from the intake manifold through the control valve, through the interstitial space to cool exhaust gas and directing the air through a second check valve out to atmosphere.

* * * * *